US009575551B2

(12) United States Patent
Junkar et al.

(10) Patent No.: US 9,575,551 B2
(45) Date of Patent: Feb. 21, 2017

(54) GNSS SERVICES ON LOW POWER HUB (71) Applicant: Intel Corporation, Santa Clara, CA (US)

(72) Inventors: Martin Junkar, San Jose, CA (US); Jun Su, San Jose, CA (US); Minnie Ho, Los Altos, CA (US); Mathew Bevilacqua, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 301 days.

(21) Appl. No.: 14/037,648

(22) Filed: Sep. 26, 2013

(65) Prior Publication Data
US 2015/0089176 A1    Mar. 26, 2015

(51) Int. Cl.
G06F 1/32 (2006.01)

(52) U.S. Cl.
CPC ............ G06F 1/3293 (2013.01); G06F 1/3206 (2013.01); *Y02B 60/121* (2013.01)

(58) Field of Classification Search
CPC ................ G06F 1/32; G06F 5/10; H04W 4/00
USPC ........................................................ 701/468
See application file for complete search history.

(56) References Cited

U.S. PATENT DOCUMENTS

| 8,510,077 | B1* | 8/2013 | Zhang | ..................... G01S 19/21 702/150 |
| 9,128,180 | B2* | 9/2015 | Saha | ..................... G06F 1/3206 |
| 2008/0186166 | A1 | 8/2008 | Zhou et al. | |
| 2008/0234935 | A1* | 9/2008 | Wolf | ..................... G01C 21/16 701/472 |
| 2009/0261958 | A1 | 10/2009 | Sundararajan et al. | |
| 2013/0238921 | A1* | 9/2013 | Alpert | ..................... G06F 1/3246 713/323 |
| 2013/0244686 | A1* | 9/2013 | Saha | ..................... G06F 1/3206 455/456.1 |
| 2013/0268199 | A1 | 10/2013 | Nielsen et al. | |
| 2016/0210239 | A1* | 7/2016 | Wang | ..................... G06F 12/0811 |

FOREIGN PATENT DOCUMENTS

CN 101559754 A 10/2009
CN 103269510 8/2013

OTHER PUBLICATIONS

Official Letter and Search Report received for Taiwanese Patent Application No. 103132643, issued on Nov. 16, 2015, 12 pages including 1 page of English translation.

* cited by examiner

*Primary Examiner* — Thomas G Black
*Assistant Examiner* — Ana Thomas
(74) *Attorney, Agent, or Firm* — Alpine Technology Law Group LLC (57) ABSTRACT In one embodiment an controller comprises logic, at least partially including hardware logic, configured to logic, at least partially including hardware logic, configured to receive location data from a location measurement apparatus, buffer the location data in a local memory, and release the location data from the local memory to a remote processor in response to one or more trigger conditions. Other embodiments may be described.

19 Claims, 9 Drawing Sheets

GNSS SERVICES ON LOW POWER HUB

RELATED APPLICATIONS

None.

BACKGROUND

The subject matter described herein relates generally to the field of electronic devices and more particularly to a global navigation satellite system (GNSS) services on a low power hub in electronic devices.

Location-based services and geofencing techniques commonly rely upon network-based location services, e.g., global positioning system (GPS) location services, to determine a location of a mobile computing device. Such network-based location services require consume significant amounts of power. Accordingly additional systems and techniques to provide GNSS-based services may find utility.

BRIEF DESCRIPTION OF THE DRAWINGS

The detailed description is described with reference to the accompanying figures.

DETAILED DESCRIPTION

Described herein are exemplary systems and methods to implement GNSS services on a low-power hub in electronic devices. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Various embodiments described herein enable mobile electronic devices, e.g., smart phones, laptop computers, tablet computers, electronic readers, and the like to implement GNSS services on a low-power hub, thereby reducing power consumption by the electronic device. By way of example, in some examples described herein electronic devices are adapted to offload GNSS data buffering functions to a low-power controller which may be incorporated into the electronic device, thereby extending the duration that the main processor(s) for the device can remain in a low-power state, e.g., a sleep state or the like. In some examples GNSS data from a location measurement apparatus such as a GNSS device may be passed to a low-power controller, which buffers the GNSS data in one or more memory buffers. When the low-power controller detects a trigger condition the GNSS data may be released to the main processor(s) of the electronic device. Location data from other location devices, e.g., WiFi network devices or cellular network devices may also be buffered in the low-power controller.

In some embodiments described herein a low-power controller may include logic, referred to herein as a location services manager to manage the data buffering process. The location services manager may be embodied as logic, e.g., hardware, software, firmware, or combinations thereof which operate on the low-power controller or on one or more components thereof. Further aspects will be described with reference to the figures.

Figure 1:
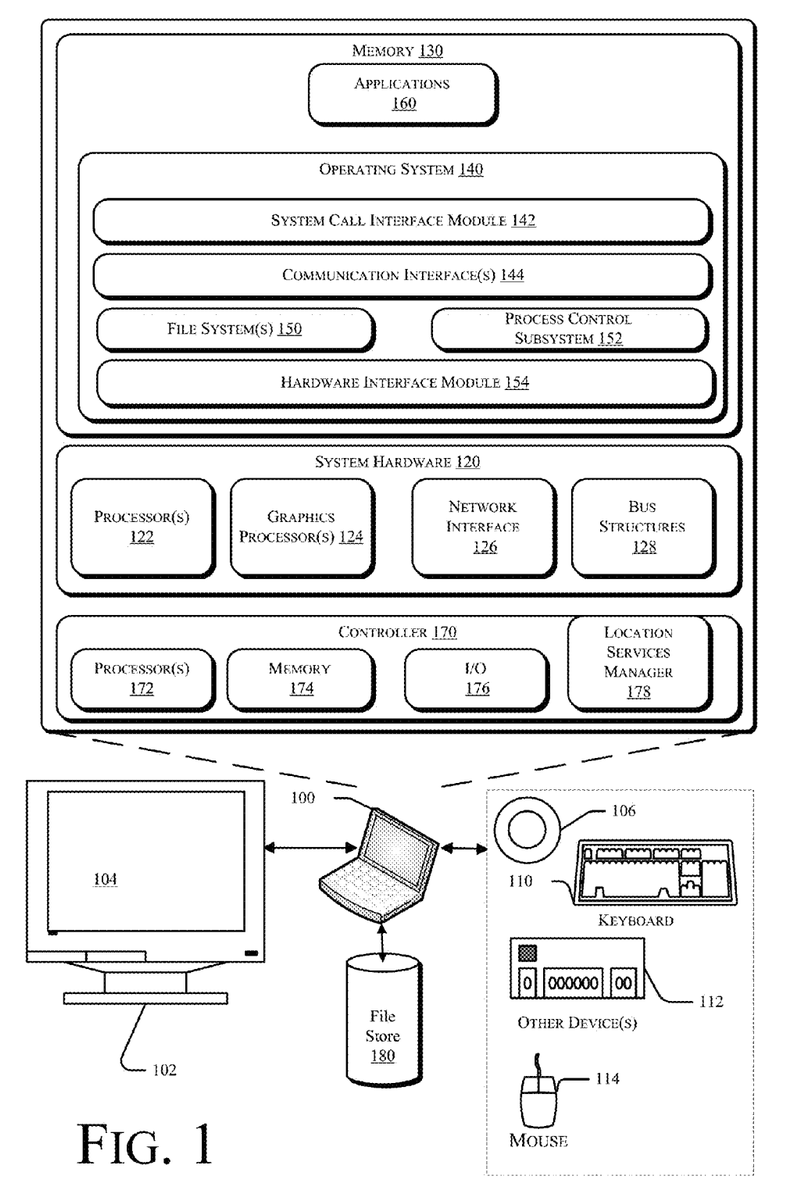
FIGS. 1-2 are schematic illustrations of exemplary electronic devices which may be adapted to implement GNSS services on a low power hub in accordance with some embodiments.

FIG. 1 is a schematic illustration of an electronic device 100 which may be adapted to implement GNSS services on a low-power controller in accordance with some embodiments. In one embodiment, electronic device 100 includes one or more accompanying input/output (I/O) devices including a display 102 having a screen 104, one or more speakers 106, a keyboard 110, one or more other I/O device(s) 112, and a mouse 114. The other I/O device(s) 112 may include a touch screen, a voice-activated input device, a track ball, and any/or other device that allows the electronic device 100 to receive input from a user.

In various examples, the electronic device 100 may be embodied as a personal computer, a laptop computer, a personal digital assistant, a mobile telephone, an entertainment device, or another computing device. The electronic device 100 includes system hardware 120 and memory 130, which may be implemented as random access memory and/or read-only memory. A file store 180 may be communicatively coupled to electronic device 100. File store 180 may be internal to computing device 108 such as, e.g., one or more hard drives, CD-ROM drives, DVD-ROM drives, or other types of storage devices. File store 180 may also be external to computer 108 such as, e.g., one or more external hard drives, network attached storage, or a separate storage network.

System hardware 120 may include one or more processors 122, graphics processors 124, network interfaces 126, and bus structures 128. In one embodiment, processor 122 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated into the packaging of processor(s) 122, onto the motherboard of computing system 100 or may be coupled via an expansion slot on the motherboard.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 130 may include an operating system 140 for managing operations of computing device 108. In one embodiment, operating system 140 includes a hardware interface module 154 that provides an interface to system hardware 120. In addition, operating system 140 may include a file system 150 that manages files used in the operation of computing device 108 and a process control subsystem 152 that manages processes executing on electronic device 100.

Operating system 140 may include (or manage) one or more communication interfaces that may operate in conjunction with system hardware 120 to transceive data packets and/or data streams from a remote source. Operating system 140 may further include a system call interface module 142 that provides an interface between the operating system 140 and one or more application modules resident in memory 130. Operating system 140 may be embodied as a UNIX operating system or any derivative thereof (e.g., Linux, Solaris, etc.) or as a Windows® brand operating system, or other operating systems.

Memory 130 may comprise one or more applications which execute on the processor(s) 122. The applications may be stored in permanent memory such as file store 180 when not in use by the electronic device 100. In use, the applications may be copied into memory 130 for execution. In the embodiment depicted in FIG. 1 the applications comprise one or more applications 160.

In some embodiments electronic device 100 may comprise a low-power controller 170. The controller 170 may be implemented as an independent integrated circuit located on or coupled to the motherboard of the electronic device 100. In the embodiment depicted in FIG. 1 the controller 170 comprises a processor 172, a memory 174, an I/O module 176 and a location services manager 178.

In some embodiments the memory module 174 may comprise a persistent flash memory module and the I/O module 176 may comprise a serial I/O module or a parallel I/O module. Because the controller 170 is physically separate from the system hardware 120 and operating system 140, the adjunct controller 170 can operate independently while the system hardware 120 remains in a low-power consumption state, e.g., a sleep state. Further, the low-power controller 170 may be secure in the sense that the low-power controller 170 is inaccessible to hacking through the operating system 140.

Figure 2:
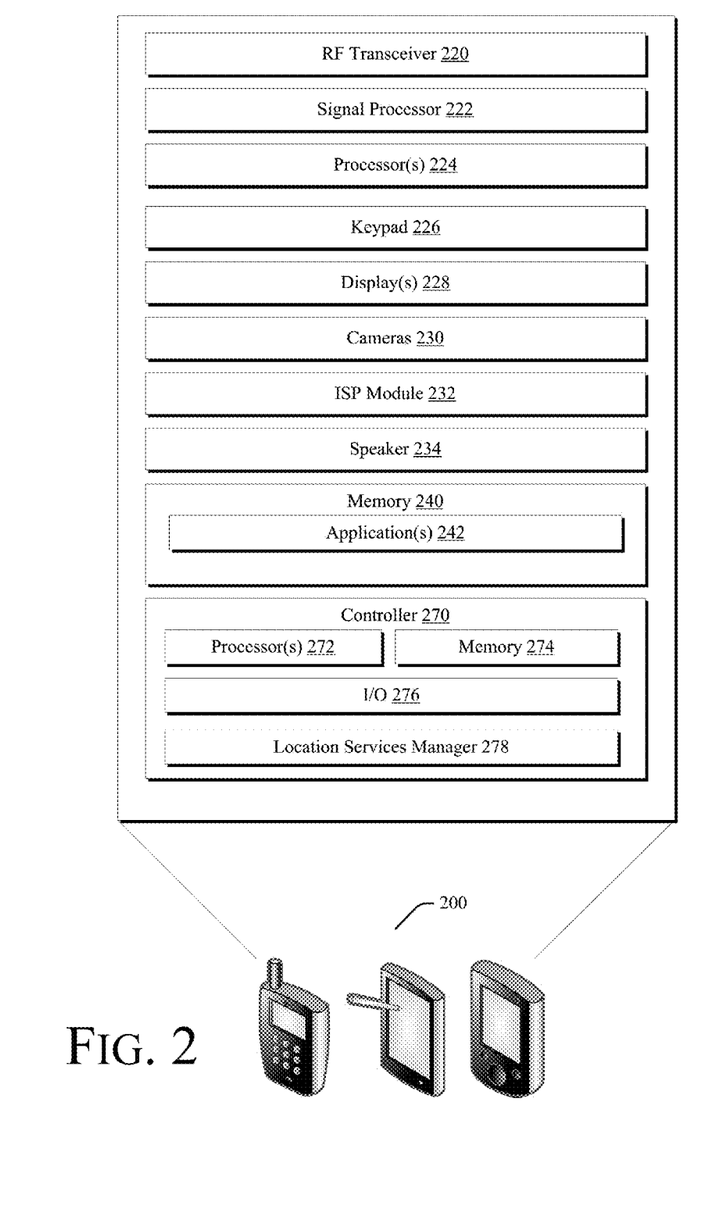

FIG. 2 is a schematic illustration of another example of an electronic device 200 which may be adapted to implement GNSS services on a low-power controller. In some aspects electronic device 200 may be embodied as a mobile telephone, a tablet computing device, a personal digital assistant (PDA), a notepad computer, or the like. Electronic device 200 may include an RF transceiver 220 to transceive RF signals and a signal processing module 222 to process signals received by RF transceiver 220.

RF transceiver 220 may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Electronic device 200 may further include one or more processors 224 and a memory module 240. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. In some embodiments, processor 224 may be one or more processors in the family of Intel® PXA27x processors available from Intel® Corporation of Santa Clara, Calif. Alternatively, other processors may be used, such as Intel's Itanium®, XEON™ ATOM™, and Celeron® processors. Also, one or more processors from other manufactures may be utilized. Moreover, the processors may have a single or multi core design.

In some embodiments, memory module 240 includes random access memory (RAM); however, memory module 240 may be implemented using other memory types such as dynamic RAM (DRAM), synchronous DRAM (SDRAM), and the like. Memory 240 may comprise one or more applications 242 which execute on the processor(s) 222.

Electronic device 200 may further include one or more input/output interfaces such as, e.g., a keypad 226 and one or more displays 228. In some embodiments electronic device 200 comprises one or more camera modules 230 and an image signal processor 232, and speakers 234.

In some embodiments electronic device 200 may include a low-power controller 270 which may be implemented in a manner analogous to that of controller 170, described above. In the embodiment depicted in FIG. 2 the controller 270 comprises one or more processor(s) 272, a memory module 274, an I/O module 276, and a location services manager 278. In some embodiments the memory module 274 may comprise a persistent flash memory module and the authentication module 276 may be implemented as logic instructions encoded in the persistent memory module, e.g., firmware or software. The I/O module 276 may comprise a serial I/O module or a parallel I/O module. Again, because the adjunct controller 270 is physically separate from the main processor(s) 224, the adjunct controller 270 can operate independently while the processor(s) 224 remains in a low-power consumption state, e.g., a sleep state. Further, the low-power controller 270 may be secure in the sense that the low-power controller 270 is inaccessible to hacking through the operating system.

Figure 3:
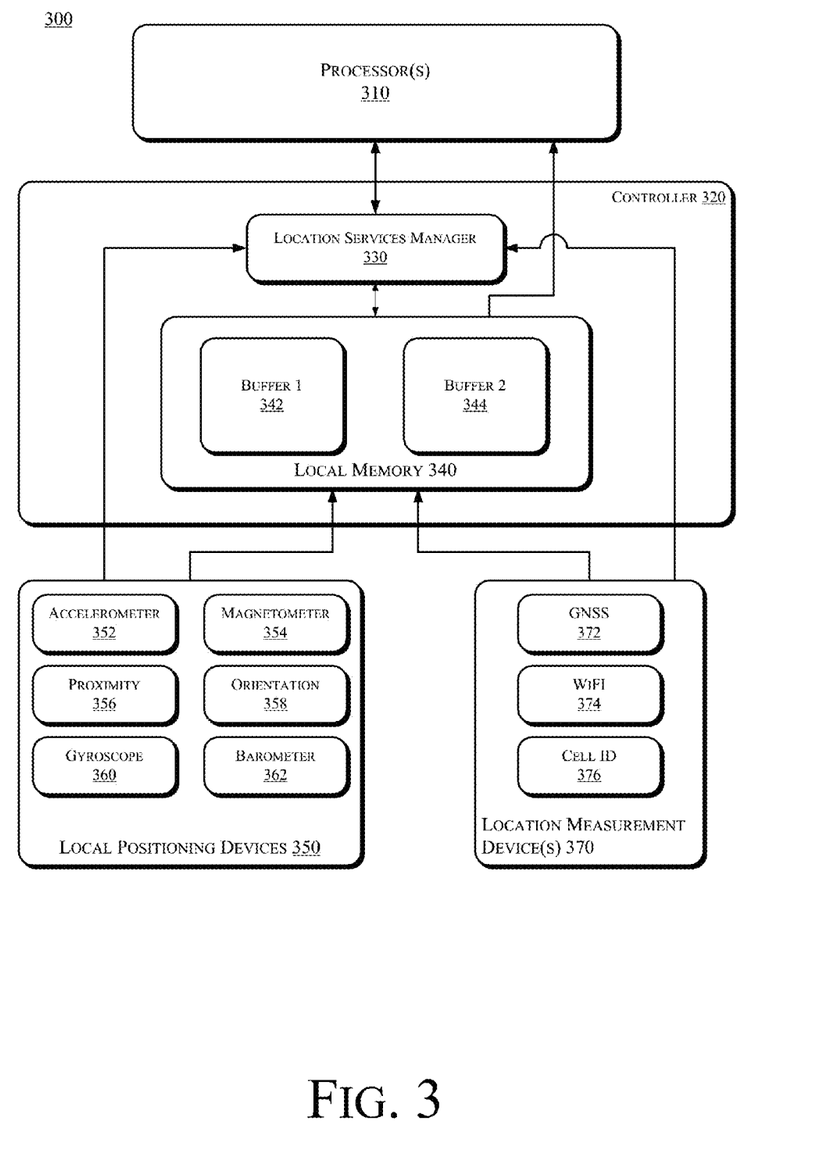
FIG. 3 is a high-level schematic illustration of an exemplary architecture to implement GNSS services on a low power hub in accordance with some embodiments.

FIG. 3 is a high-level schematic illustration of an exemplary architecture 300 to implement GNSS services on a low-power controller. Referring to FIG. 3, a low-power controller 320 is communicatively coupled to a processor 310 via a suitable communication bus. Controller 320 may comprise a location services manager 330 to manage GNSS data buffering operations and other location services and a local memory 340. As described above, in some examples the location services manager 330 may be implemented as logic instructions executable on controller 320, e.g., as software or firmware, or may be reduced to hardwired logic circuits. Local memory 340 may be implemented using volatile and/or non-volatile memory and may comprise one or more memory buffers 342, 344.

Controller 320 may be communicatively coupled to one or more local positioning devices 350 which provide signals that indicate whether an electronic device is in motion or other environmental conditions. For example, local positioning devices 350 may include an accelerometer 352, a magnetometer 358, a proximity detector 356, an orientation sensor 358, a gyroscope 360 or and a barometer 362.

Controller 320 may also be communicatively coupled to one or more location measurement devices 370, which may include a GNSS device 372, a WiFi device 374 and a cellular network device 376. GNSS device 372 may generate location measurements using a satellite network such as the Global Positioning System (GPS) or the like. WiFi device 374 may generate location measurements based on a location of a WiFi network access point. Similarly, Cell ID device may generate location measurements base on geographical coordinates of corresponding cellular base stations.

Having described various structures of a system to implement GNSS services on a low-power hub in electronic devices, operating aspects of a system will be explained with reference to FIG. 4, which is a flow chart illustrating operations in a method to implement GNSS services on a low-power hub in electronic devices. The operations depicted in the flowchart of FIG. 4 may be implemented by the location services manager 330.

Figure 4:
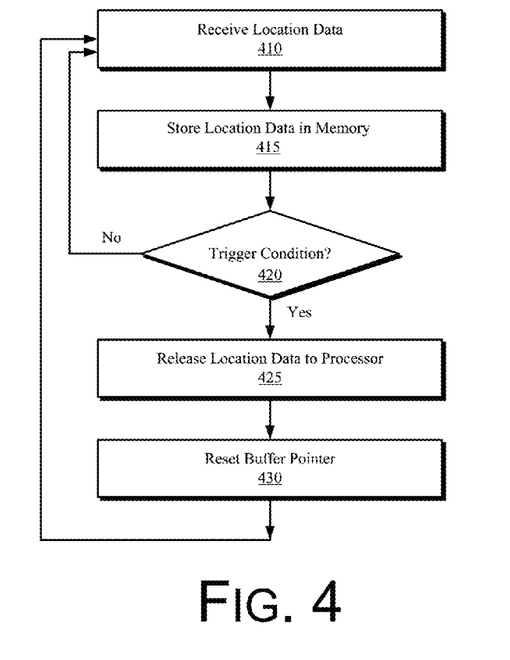
FIG. 4 is a flowchart illustrating operations in a method to implement GNSS services on a low power hub in accordance with some embodiments.

Referring to FIG. 4, at operation 410 the location services manager 330 receives location data from one or more of the location measurement device(s) 370. In some examples the location services manager 330 receives GNSS measurement data from the GNSS device 372 and stores the GNSS measurement data in the local memory 340. For example, the GNSS measurement data may be stored (operation 415) in one or both of the memory buffers 342, 344.

If, at operation 420, one or more trigger conditions are not met then control passes back to operation 410 and the location services manager 330 continues to receive and store location data received from the location measurement device(s) 370. By contrast, if at operation 420 one or more trigger conditions are met then control passes to operation 425 and the location services manager 330 releases the location data to the processor(s) 310 and wake-up the main processor at such time, if needed One example of a trigger condition may be a predetermined period of time elapsing. For example, location services manager 330 may be configured to release GNSS measurement data stored in the local memory 340 at predetermined time intervals such as every 1000 to 5000 milliseconds.

Alternatively, or in addition, location services manager 330 may be configured to release GNSS measurement data stored in the local memory 340 in response to data values (measurements) received from GNSS 372

Alternatively, or in addition, location services manager 330 may be configured to release GNSS measurement data stored in the local memory 340 in response to signals from one or more of the local positioning devices 350 which indicate that the electronic device into which controller 320 is incorporated is in motion, has changed its orientation, or in response to a change in the environment as indicated by a change in the output of barometer 362.

Alternatively, or in addition, location services manager 330 may be configured to release GNSS measurement data stored in the local memory 340 in response to a request for updated location information. The request may originate from a user of the electronic device or from an application which executes on processor 310.

Alternatively, or in addition, location services manager 330 may be configured to release GNSS measurement data stored in the local memory 340 in response to a determination that the local memory has consumed a predetermined amount of storage capacity. For example, location services manager 330 may be configured to release GNSS measurement data in response to a determination that the data buffer(s) 342, 344 are at 95 percent of their storage capacity. In an alternate example the location services manager 330 may be configured to write the location measurement data received from location measurement devices 370 into the buffers 342, 344 in an alternating fashion. For example, measurement data may be stored to buffer 342 first, and when buffer 342 fills the data in buffer 342 may be released and new data may be stored in buffer 344.

At operation 430 the location services manager 330 resets a buffer pointer in local memory 340 for new location measurement data received from location measurement devices 370. Control then passes back to operation 410 and the location services manager continues to receive location data from the location measurement device(s) 370.

Thus, the operations depicted in FIG. 4 enable location services manager 330 to buffer location measurement data received from location measurement devices 370, and to release the location measurement data to the main processor(s) 310 in an electronic device on a periodic basis in response to one or more trigger conditions. This enables the main processor(s) 310 to remain in a sleep state for an extended period of time, thereby reducing power consumption in the electronic device.

Figure 5:
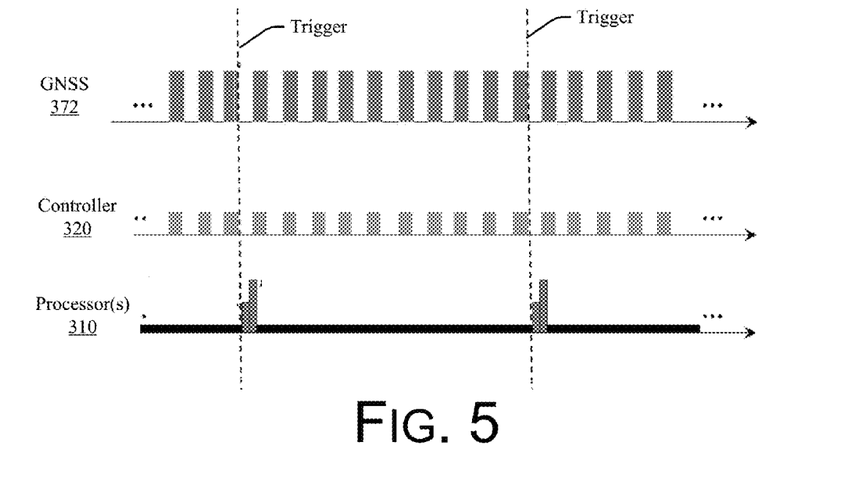
FIG. 5 is a timing diagram for a method to implement GNSS services on a low power hub in accordance with some embodiments.

FIG. 5 is a timing diagram for a method to implement GNSS services on a low power hub in accordance with some embodiments. As illustrated in FIG. 5, GNSS device 372 activates periodically to send location measurement data to controller 320, and controller 320 activates to receive the data from GNSS device 372 and to store the data in local memory 340. The processor(s) 310 are activated periodically in response to a trigger condition being satisfied. As is evident from FIG. 5, buffering the location measurement data in the controller 320 significantly increases the amount of time that processor(s) 310 can spend in a low-power state.

Figure 6:
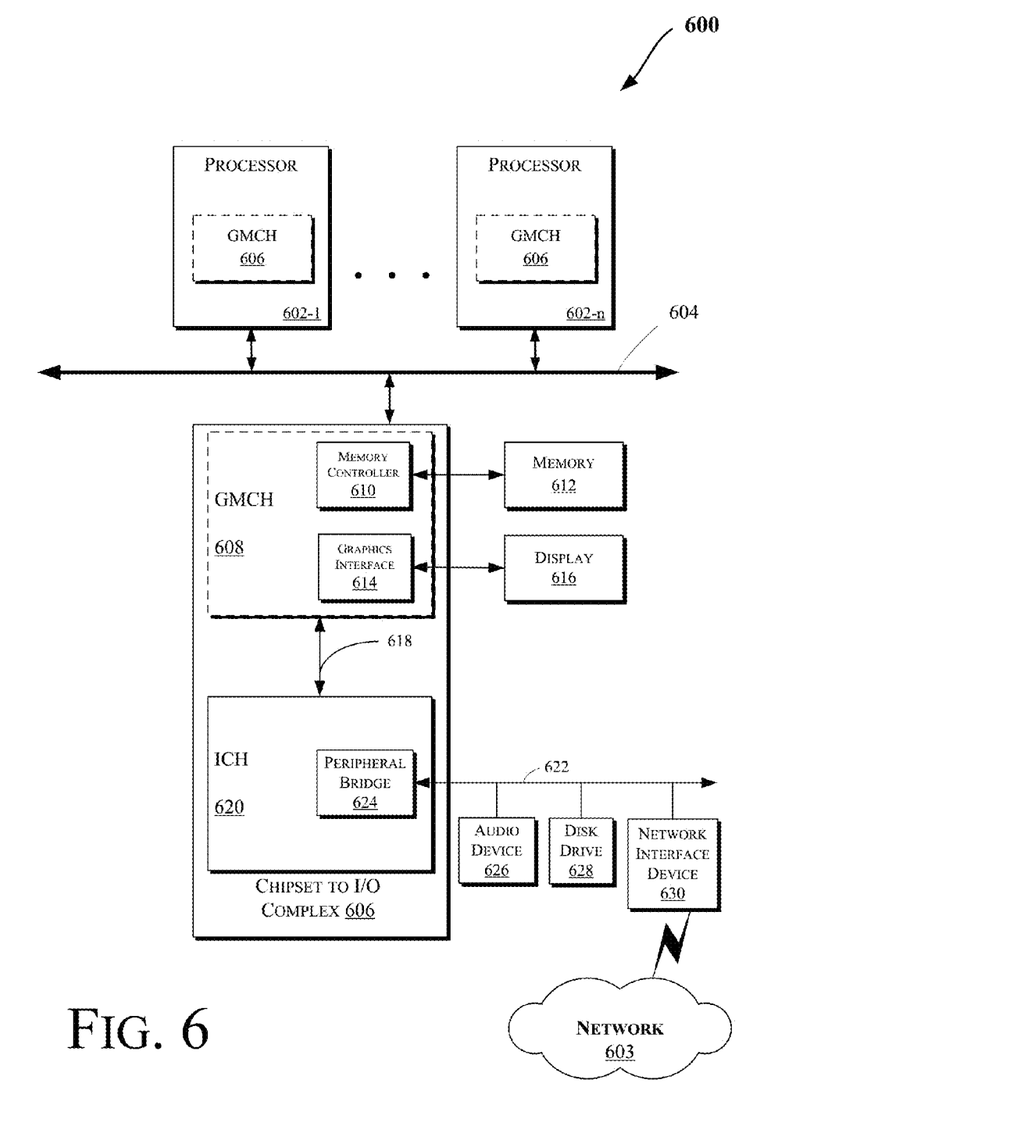
FIGS. 6-10 are schematic illustrations of electronic devices which may be adapted to implement GNSS services on a low power hub in accordance with some embodiments.

As described above, in some embodiments the electronic device may be embodied as a computer system. FIG. 6 illustrates a block diagram of a computing system 600 in accordance with an embodiment of the invention. The computing system 600 may include one or more central processing unit(s) (CPUs) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an embodiment, one or more of the processors 602 may be the same or similar to the processors 102 of FIG. 1. For example, one or more of the processors 602 may include the control unit 120 discussed with reference to FIGS. 1-3. Also, the operations discussed with reference to FIGS. 3-5 may be performed by one or more components of the system 600.

A chipset to I/O complex 606 may also communicate with the interconnection network 604. The chipset to I/O complex 606 may include a graphics memory control hub (GMCH) 608. The GMCH 608 may include a memory controller 610 that communicates with a memory 612 (which may be the same or similar to the memory 130 of FIG. 1). The memory 412 may store data, including sequences of instructions, that may be executed by the processor 602, or any other device included in the computing system 600. In one embodiment of the invention, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple processors and/or multiple system memories.

The GMCH 608 may also include a graphics interface 614 that communicates with a display device 616. In one embodiment of the invention, the graphics interface 614 may communicate with the display device 616 via an accelerated graphics port (AGP). In an embodiment of the invention, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the processor 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some embodiments of the invention. In addition, the processor 602 and one or more other components discussed herein may be combined to form a single chip (e.g., to provide a System on Chip (SOC)). Furthermore, the graphics accelerator 616 may be included within the MCH 608 in other embodiments of the invention.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
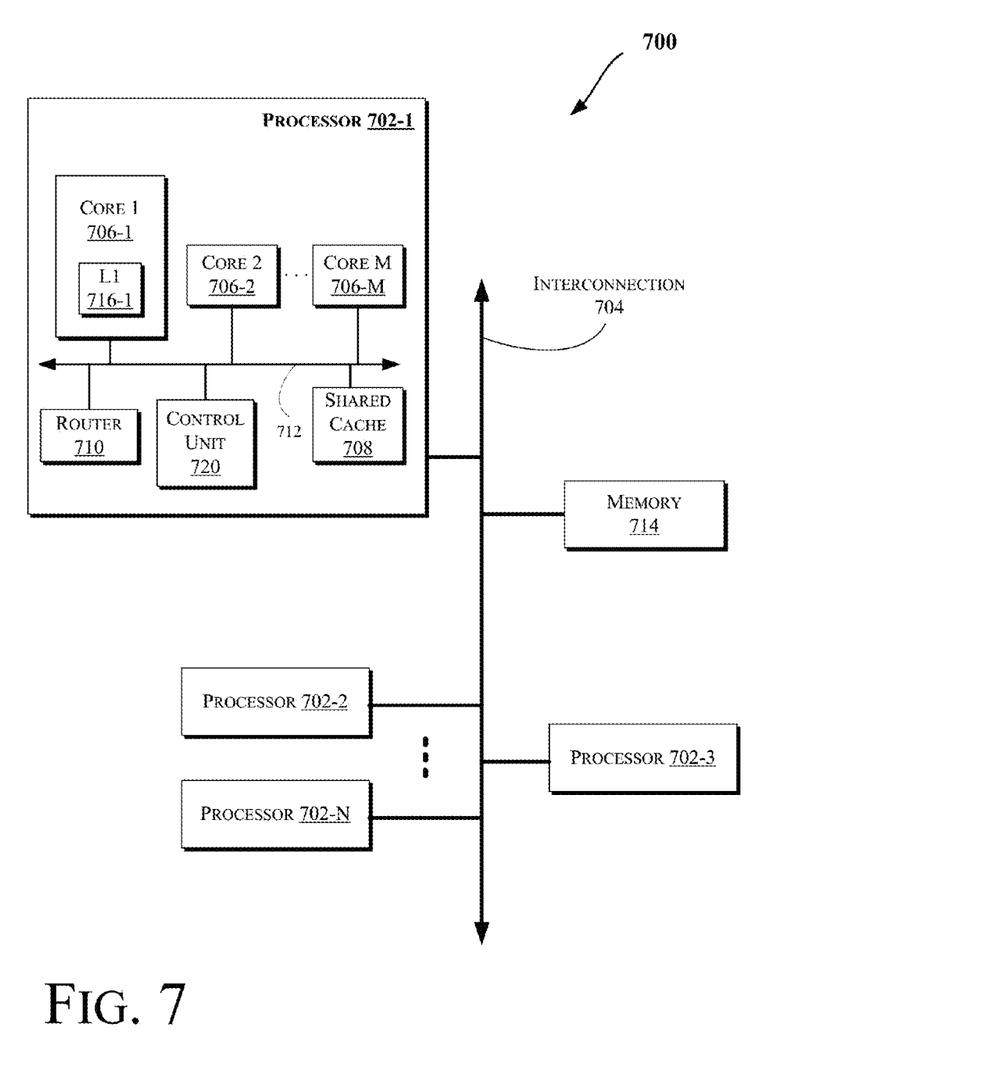

FIG. 7 illustrates a block diagram of a computing system 700, according to an embodiment of the invention. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an embodiment, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one embodiment, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an embodiment, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some embodiments, one or more of the cores 706 may include a level 1 (L1) cache 716-1 (generally referred to herein as "L1 cache 716"). In one embodiment, the control unit 720 may include logic to implement the operations described above with reference to the memory controller 122 in FIG. 2.

Figure 8:
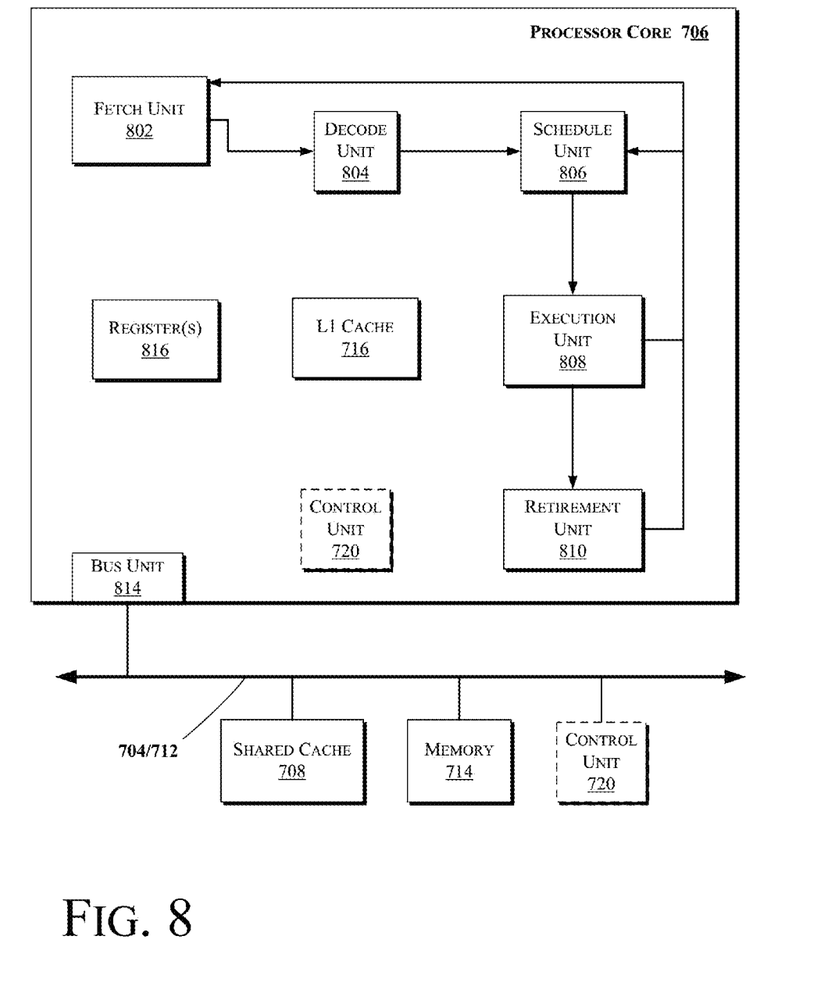

FIG. 8 illustrates a block diagram of portions of a processor core 706 and other components of a computing system, according to an embodiment of the invention. In one embodiment, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one embodiment, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an embodiment, the execution unit 808 may include more than one execution unit. The execution unit 808 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 808.

Further, the execution unit 808 may execute instructions out-of-order. Hence, the processor core 706 may be an out-of-order processor core in one embodiment. The core 706 may also include a retirement unit 810. The retirement unit 810 may retire executed instructions after they are committed. In an embodiment, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various embodiments the control unit 720 may be located elsewhere such as inside the core 706, coupled to the core via bus 704, etc.

Figure 9:
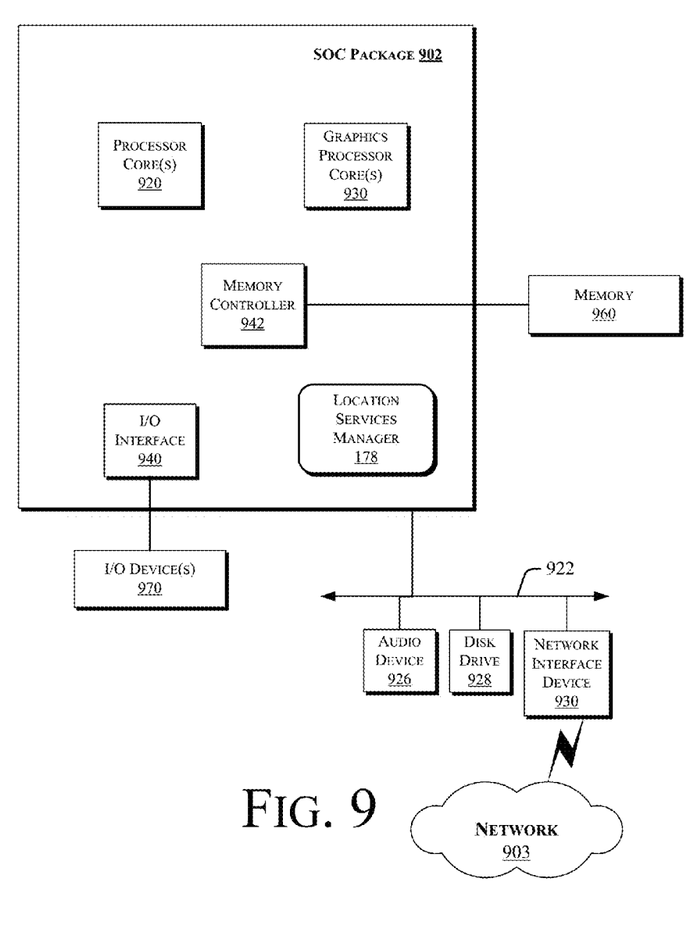

In some embodiments, one or more of the components discussed herein can be embodied as a System On Chip (SOC) device. FIG. 9 illustrates a block diagram of a SOC package in accordance with an embodiment. As illustrated in FIG. 9, SOC 902 includes one or more processor cores 920, one or more graphics processor cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one embodiment, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an embodiment, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch screen, a speaker, or the like.

SOC package 902 may communicate with an audio device 926, one or more disk drive(s) 928, and a network interface device 930 (which is in communication with a network 903). Other devices may communicate via bus 922. Also, various components (such as the network interface device 930) may communicate with the MCH 608 in some embodiments of the invention.

Location services manager 178 may be implemented as logic which executes on SOC package 902.

Figure 10:
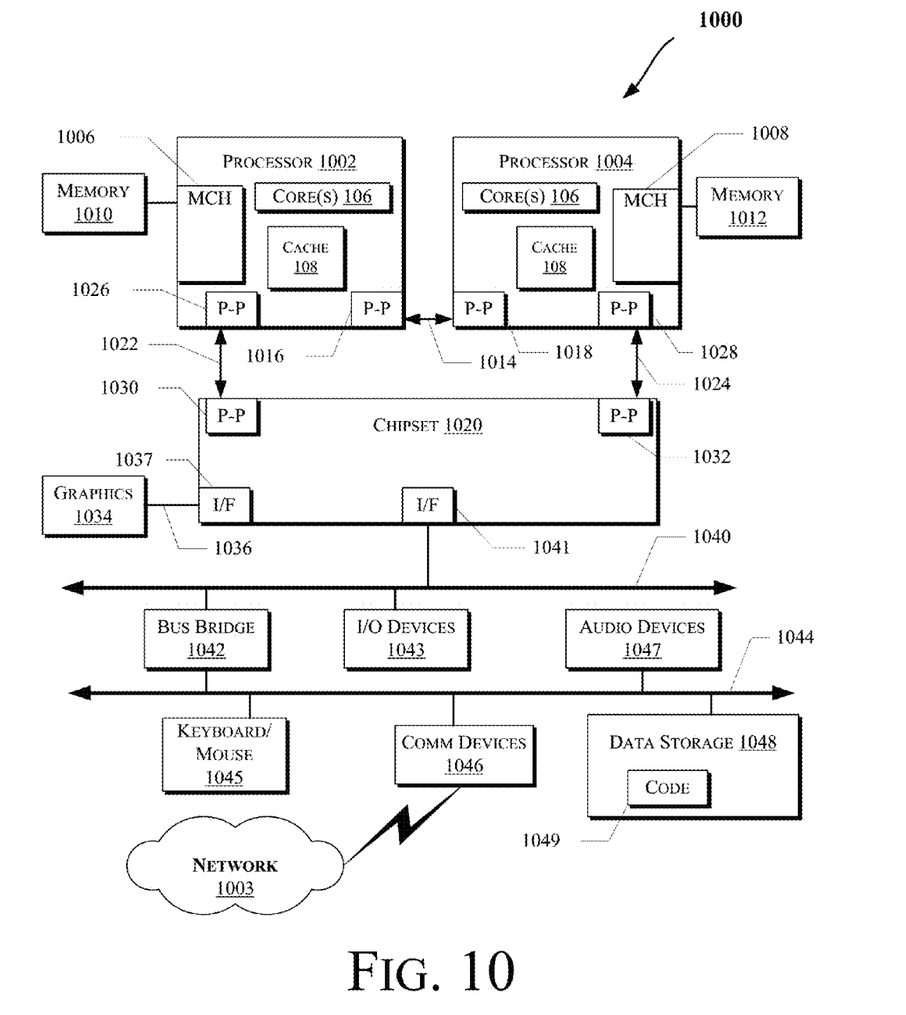

FIG. 10 illustrates a computing system 1000 that is arranged in a point-to-point (PtP) configuration, according to an embodiment of the invention. In particular, FIG. 10 shows a system where processors, memory, and input/output devices are interconnected by a number of point-to-point interfaces. The operations discussed with reference to FIG. 2 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012. MCH 1006 and 1008 may include the memory controller 120 and/or logic 125 of FIG. 1 in some embodiments.

In an embodiment, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

As shown in FIG. 10, one or more of the cores 106 and/or cache 108 of FIG. 1 may be located within the processors 1004. Other embodiments of the invention, however, may exist in other circuits, logic units, or devices within the system 1000 of FIG. 10. Furthermore, other embodiments of the invention may be distributed throughout several circuits, logic units, or devices illustrated in FIG. 10.

The chipset 1020 may communicate with a bus 1040 using a PtP interface circuit 1041. The bus 1040 may have one or more devices that communicate with it, such as a bus bridge 1042 and I/O devices 1043. Via a bus 1044, the bus bridge 1043 may communicate with other devices such as a keyboard/mouse 1045, communication devices 1046 (such as modems, network interface devices, or other communication devices that may communicate with the computer network 1003), audio I/O device, and/or a data storage device 1048. The data storage device 1048 (which may be a hard disk drive or a NAND flash based solid state drive) may store code 1049 that may be executed by the processors 1004.

The following examples pertain to further embodiments.

Example 1 is a controller comprising logic, at least partially including hardware logic, configured to receive location data from a location measurement apparatus, buffer the location data in a local memory, and release the location data from the local memory to a remote processor in response to one or more trigger conditions In Example 2, the location data of Example 1 can optionally include at least one of measurement data from a global navigation satellite system (GNSS) device or location data from a network access point device.

In Example 3, the subject matter of any one of Examples 1-2 can optionally include logic further configured to write the location data into alternating memory buffers in the local memory.

In Example 4, the subject matter of any one of Examples 1-3 can optionally include logic further configured to determine a trigger condition.

In Example 5, the subject matter of any one of Examples 1-4 can optionally include a trigger condition which includes at least one of a predetermined time period elapsing, receiving a signal indicating that the controller has moved, receiving a signal requesting a location update, or determining that the local memory has consumed a predetermined amount of storage capacity.

In Example 6, the subject matter of any one of Examples 1-6 can optionally include logic further configured to reset a buffer pointer in the local memory.

Example 7 is a computer program product comprising logic instructions stored in a non-transitory computer readable medium which, when executed by a controller, configure the controller to receive location data from a location measurement apparatus, buffer the location data in a local memory, and release the location data from the local memory to a remote processor in response to one or more trigger conditions.

In Example 8, the location data of Example 7 can optionally include at least one of measurement data from a global navigation satellite system (GNSS) device or location data from a network access point device.

In Example 9, the subject matter of any one of Examples 1-2 can optionally include logic instructions stored in a non-transitory computer readable medium which, when executed by a controller, configure the controller to write the location data into alternating memory buffers in the local memory.

In Example 10, the subject matter of any one of Examples 7-9 can optionally include logic instructions stored in a non-transitory computer readable medium which, when executed by a controller, configure the controller to determine a trigger condition.

In Example 11, the subject matter of any one of Examples 7-10 can optionally include a trigger condition which includes at least one of a predetermined time period elapsing, receiving a signal indicating that the controller has moved, receiving a signal requesting a location update, or determining that the local memory has consumed a predetermined amount of storage capacity.

In Example 12, the subject matter of any one of Examples 7-11 can optionally include logic instructions stored in a non-transitory computer readable medium which, when executed by a controller, configure the controller to reset a buffer pointer in the local memory.

Example 13 is an electronic device, comprising a local positioning device and a controller comprising logic, at least partially including hardware logic, configured to receive location data from a location measurement apparatus, buffer the location data in a local memory, and release the location data from the local memory to a remote processor in response to one or more trigger conditions.

In Example 14, the location data of Example 13 can optionally include at least one of measurement data from a global navigation satellite system (GNSS) device or location data from a network access point device.

In Example 15, the subject matter of any one of Examples 13-14 can optionally include logic further configured to write the location data into alternating memory buffers in the local memory.

In Example 16, the subject matter of any one of Examples 13-15 can optionally include logic further configured to determine a trigger condition.

In Example 17, the subject matter of any one of Examples 13-16 can optionally include a trigger condition which includes at least one of a predetermined time period elapsing, receiving a signal indicating that the controller has moved, receiving a signal requesting a location update, or determining that the local memory has consumed a predetermined amount of storage capacity.

In Example 18, the subject matter of any one of Examples 13-17 can optionally include logic further configured to reset a buffer pointer in the local memory.

In Example 19, the subject matter of any one of Examples 13-18 can optionally include logic further configured to receive location data from the controller, and determine a location of the electronic device from the location data.

Example 20 is a method, comprising receiving, in a controller, location data from a location measurement apparatus, buffering the location data in a local memory, and releasing the location data from the local memory to a remote processor in response to one or more trigger conditions.

In Example 21, the location data of Example 20 can optionally include at least one of measurement data from a global navigation satellite system (GNSS) device or location data from a network access point device.

In Example 22, the subject matter of any one of Examples 20-21 can optionally include writing the location data into alternating memory buffers in the local memory.

In Example 23, the subject matter of any one of Examples 20-22 can optionally include determining a trigger condition.

In Example 24, the subject matter of any one of Examples 20-23 can optionally include a trigger condition which includes at least one of a predetermined time period elapsing, receiving a signal indicating that the controller has moved, receiving a signal requesting a location update, or determining that the local memory has consumed a predetermined amount of storage capacity.

In Example 25, the subject matter of any one of Examples 20-24 can optionally include resetting a buffer pointer in the local memory.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A controller, comprising:
    logic, at least partially including hardware logic, configured to:
        receive a first location data set from a location measurement apparatus;
        store the first location data in a first data buffer of a local memory; and
        release the first location data from the first data buffer of the local memory to a remote processor when the first data buffer of the local memory reaches a predetermined capacity;
        receive a second location data set from a location measurement apparatus;
        store the second location data in a second data buffer of the local memory while the first location data set is being transferred to the remote processor.

2. The controller of claim 1, wherein the location data comprises at least one of:
    measurement data from a global navigation satellite system (GNSS) device; or
    location data from a network access point device.

3. The controller of claim 1, wherein the logic is further configured to power down the second data buffer of the local memory when the first location data is being stored in the first data buffer of the local memory.

4. The controller of claim 1, wherein the logic is further configured to power down the first data buffer of the local memory when the second location data is being stored in the second data buffer of the local memory.

5. The controller of claim 4, wherein the logic is further configured to release the first location data to the remote processor in response to at least one of:
    a predetermined time period elapsing;
    receiving a signal indicating that the controller has moved;
    receiving a signal requesting a location update; or
    determining that the local memory has consumed a predetermined amount of storage capacity.

6. The controller of claim 1, wherein the logic is further configured to:
    reset a buffer pointer in the local memory.

7. A computer program product comprising logic instructions stored in a non-transitory computer readable medium which, when executed by a controller, configure the controller to:
    receive a first location data set from a location measurement apparatus;
        store the first location data in a first data buffer of a local memory; and
        release the first location data from the first data buffer of the local memory to a remote processor when the first data buffer of the local memory reaches a predetermined capacity;
        receive a second location data set from a location measurement apparatus;
        store the location data in a second data buffer of the local memory while the first location data set is being transferred to the remote processor.

8. The computer program product of claim 7, wherein the location data comprises at least one of:
    measurement data from a global navigation satellite system (GNSS) device; or
    location data from a network access point device.

9. The computer program product of claim 7, further comprising logic instructions stored in a non-transitory computer readable medium which, when executed by a controller, configure the controller to power down the second data buffer of the local memory when the first location data is being stored in the first data buffer of the local memory.

10. The computer program product of claim 7, further comprising logic instructions stored in a non-transitory computer readable medium which, when executed by a controller, configure the controller to power down the first data buffer of the local memory when the second location data is being stored in the second data buffer of the local memory.

11. The computer program product of claim 10, wherein the logic instructions further configure the processor to release the first location data to the remote processor in response to at least one of:
a predetermined time period elapsing;
receiving a signal indicating that the controller has moved;
receiving a signal requesting a location update; or
determining that the local memory has consumed a predetermined amount of storage capacity.

12. The computer program product of claim 7, further comprising logic instructions stored in a non-transitory computer readable medium which, when executed by a controller, configure the controller to reset a buffer pointer in the local memory.

13. An electronic device, comprising:
a local positioning device; and
a controller, comprising:
logic, at least partially including hardware logic, configured to:
receive a first location data set from a location measurement apparatus;
store the first location data in a first data buffer of a local memory; and
release the first location data from the first data buffer of the local memory to a remote processor when the first data buffer of the local memory reaches a predetermined capacity;
receive a second location data set from a location measurement apparatus;
store the location data in a second data buffer of the local memory while the first location data set is being transferred to the remote processor.

14. The electronic device of claim 13, wherein the location data comprises at least one of:
measurement data from a global navigation satellite system (GNSS) device; or
location data from a network access point device.

15. The electronic device of claim 13, wherein the logic is further configured to power down the second data buffer of the local memory when the first location data is being stored in the first data buffer of the local memory.

16. The electronic device of claim 13, wherein the logic is further configured to power down the second data buffer of the local memory when the data is being stored in the first data buffer of the local memory.

17. The electronic device of claim 16, wherein the logic is further configured to release the first location data to the remote processor in response to at least one of:
a predetermined time period elapsing;
receiving a signal indicating that the controller has moved;
receiving a signal requesting a location update; or
determining that the local memory has consumed a predetermined amount of storage capacity.

18. The electronic device of claim 13, wherein the logic is further configured to:
reset a buffer pointer in the local memory.

19. The electronic device of claim 13, wherein the processor comprises logic to:
receive location data from the controller; and
determine a location of the electronic device from the location data.

* * * * *